May 24, 1966  R. C. FARMER  3,253,150
REFLECTIVE SCANNING MECHANISMS FOR CONICAL SCAN HORIZON SENSORS
Filed Oct. 12, 1962  2 Sheets-Sheet 1

INVENTOR.
ROGER C. FARMER
BY
ATTORNEY

May 24, 1966 R. C. FARMER 3,253,150
REFLECTIVE SCANNING MECHANISMS FOR CONICAL SCAN HORIZON SENSORS
Filed Oct. 12, 1962 2 Sheets-Sheet 2

INVENTOR.
ROGER C. FARMER
BY
ATTORNEY

United States Patent Office 3,253,150
Patented May 24, 1966

3,253,150
REFLECTIVE SCANNING MECHANISMS FOR
CONICAL SCAN HORIZON SENSORS
Roger C. Farmer, Darien, Conn., assignor to Barnes Engineering Company, Stamford, Conn., a corporation of Delaware
Filed Oct. 12, 1962, Ser. No. 230,145
10 Claims. (Cl. 250—83.3)

This invention relates to improved scanning optics particularly for conical scan horizon sensors.

Horizon sensors of the conical scan type have achieved great practical success particularly for use in various space vehicles such as rockets, Mercury capsules and the like. A typical conical scan horizon sensor which has achieved practical utility is described in the patent to Merlen, 3,020,407, February 6, 1962. In the Merlen sensor a conical scan is produced by means of a rotating prism of germanium. The sensor, as with most sensors, also generates a reference signal at a predetermined vehicle attitude. A detector which, in the case of germanium scanning, is a infrared detector, scans across space and earth and the electronic circuits used in the sensor measure the difference between rotational intervals from one horizon radiation discontinuity to the reference signal and from the reference signal to the other horizon discontinuity. When the two rotational intervals are the same, which occurs when the vehicle is in predetermined attitude, a zero signal is produced. Tilt about the axis on which the horizon sensor is mounted is evidenced by error signals of different polarity or phase. This description of the actual sensing is quite brief as the present invention deals only with an improved scanning mechanism and does not change the electronic circuits which will, therefore, not be specifically described.

A number of problems have arisen with horizon sensors. Thus, for example, problems occur when a scan across the earth encounters relatively cold areas such as cold clouds, polar ice and the like. It has been proposed to filter the radiation so that only radiation in the carbon dioxide band between 14 and 16μ is utilized. Another proposal is to use a very low level energy slice in which connection it should be realized that practically all useful horizon sensors respond to an energy level between rather narrow maximum or minimum limits so that changes in radiation intensity as a scan moves across the earth do not alter the signal. The second proposal involves taking a very low energy level slice so that cold clouds and similar portions of the earth's scan are above the maximum energy for the slice and, therefore, do not alter the signal from the detector after processing. This solution, while theoretically very attractive, presents problems because the signal in a very low level slice is but little above the noise level of the instrument and so often does not produce a sufficiently good signal to noise ratio to be utilized effectively.

Both in the case of the limitation to the carbon dioxide band and the low level slice without wavelength range selection there is a serious problem in obtaining sufficient energy. The germanium optics of the Merlen sensor cut on at about 1.8μ and cut off to a substantial extent at about 18μ. Since there is a considerable thickness of germanium in the prism, immersion lens for the detector and the like, if the slice is taken so that radiation from a 200° K. body is above the minimum limit and within the slice of signal intensity chosen by the electronic circuits the transmission cutoff and unavoidable losses from reflection and the like can result in an overall transmission of energy of only about 7 percent. This is too low for a reliable signal to noise ratio and so has rendered the prism scanning horizon sensors less effective where complete elimination of the effect of cold clouds and the like is desired.

The present invention deals with a new type of scanning which is much more efficient in energy utilization and can be used with wavelength limitation of radiation and a low signal slice so that the effect of cold clouds and the like be completely eliminated without reducing the signal to noise ratio to a point where difficulties arise.

Essentially the present invention uses a multiple reflection scanner. Reflection scanning broadly is not the subject of the present invention, it forms the subject matter of a copending application of Astheimer and Peterssen, Serial No. 195,185, filed May 16, 1962, which issued on November 10, 1964, as U.S. Patent No. 3,156,823. In that application an inclined mirror, either flat or imaging, is rotated to produce a conical scan. A great increase in efficiency and radiation utilization results but the device requires a large scanning head, accurate counterbalancing and a slightly greater vulnerability to the enormous accelerations encountered in the launching of space vehicles. The Astheimer and Peterssen sensor, however, is thoroughly practical and the present invention constitutes only an improvement thereover in which the advantages of reflective optics are obtained in more compact form and in an extremely rugged and light structure. The ruggedness and compactness is, of course, an important advantage in sensors which are to be subjected to tremendous accelerations and which must operate reliably for long periods of time without attention and with minimum power consumption. The present invention with as low a power consumption and compactness as great as the prism scanning sensors of the Merlen patent permits the advantage of the greater energy utilization of reflective optics.

Essentially the present invention takes the reflective optics and distributes them among a number of small mirrors fitted in a form reminiscent of a venetian blind. Very light optics can be obtained and they are in much better dynamic balance than a single mirror unless great care is used in counterbalancing.

Another advantage of the present invention is that it is readily possible to incorporate with the mirrors light baffles so that direct radiations are eliminated to a maximum extent. This is of practical importance because with low level signals required by a low level slice in the electronic circuits scattered direct radiation presents a problem as it reduces a sharpness of the signal and is generally undesirable. In the preferred form of the present invention direct radiation is practically entirely eliminated without any loss in radiation collection efficiency.

Another advantage of the present invention is that comparatively small openings can be used to produce an optical aperture that is large. Theoretically this does not increase the radiation reflecting efficiency of the scanning system. But it is a very practical advantage because in any space vehicle it is desirable to limit openings or windows to small dimensions. The present invention permits maximum aperture optically with a minimum size of opening.

The invention will be described in greater detail in conjunction with the drawings in which.

Figure 1:
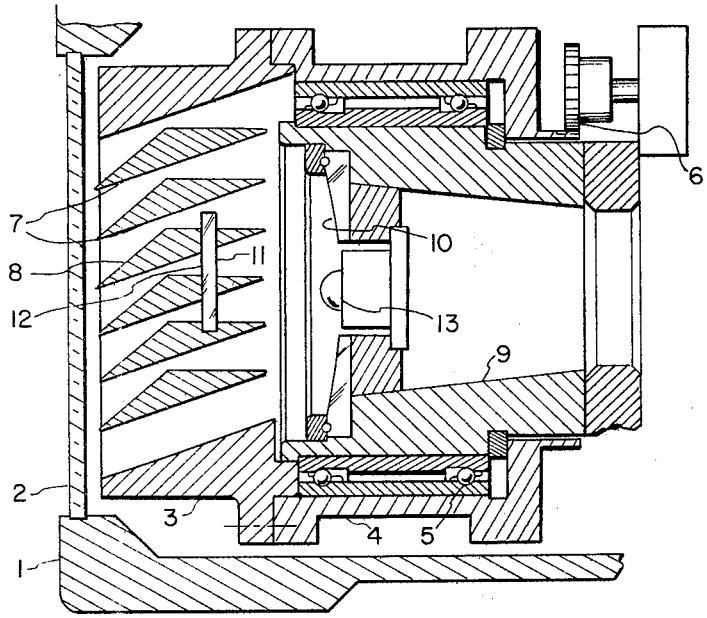
FIG. 1 is a cross section through an all catoptric scanning head.
Figure 3:
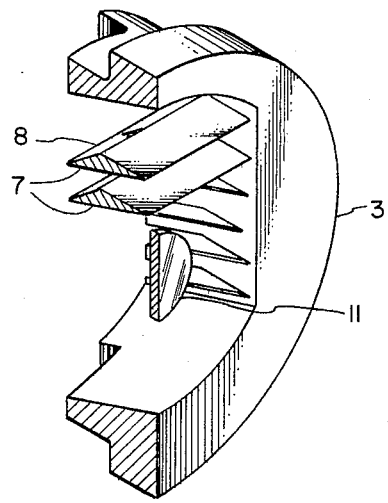
FIG. 3 is an isometric drawing of a scanner assembly.

FIGS. 1 and 3 illustrate the scanning portion of the typical horizon sensor. The horizon sensor is provided with a casing 1 in which is mounted a window 2. A rotating barrel 3 is fastened to framework 4 which turns on bearings 5 being driven by a gearing 6. Within the barrel are mounted in grooves a series of mirrors 7 of triangular cross section with backs 8 constituting baffles against direct light entering the instrument. As the barrel 3 turns the mirrors scan a cone, reflected rays striking a converging mirror 10 in a framework 9 which supports the bearings 5 and are reflected to a plane mirror 11 from which they strike an immersed detector 13 of conventional design which is, therefore, not shown in detail.

Reference has been made above to cutting off radiation either to match the carbon dioxide band or to cut off visible and shorter wave infrared radiation which minimizes problems encountered when the sun is scanned. The present invention is, of course, not limited to any particular method of restricting the radiation to a desired band. However, one very desirable and efficient method is to utilize the phenomenon of residual reflected rays usually referred to as reststrahlen. This is illustrated in FIG. 1 although it is not the subject matter of the present invention constituting the subject matter of the copending application of Weiss, Serial No. 230,130, filed October 12, 1962, which issued on June 6, 1965, as U.S. Patent No. 3,193,682. The mirror 11 is made of lithium fluoride with an infrared absorbing backing 12. Lithium fluoride reflects reststrahlen beginning at about $13\mu$, shorter wavelengths being absorbed in the lithium fluoride or in the backing 12. The efficiency of the mirror as a reststrahlen filter is quite high and is, therefore, a desirable method for producing shorter wavelength cutoff. It is, therefore, illustrated.

The scanning efficiency of the mirrors is much higher than a scanning prism and associated optics and so it is possible to maintain the slice of signal response at a point reached by radiation from a 200° K. body. The immersed detector 13 may have a germanium lens or it may have a silicon lens where somewhat greater long wave energy utilization is desired.

While the present invention is directed to the change in the optics of the system it should be noted that it is often desirable to combine this with the best electronics available. Thus, for example, the electronic circuits such as those described in the application, Johnson and Polk, Serial No. 218,002, filed August 20, 1962, may be used. The present invention is not limited to the use of any particular design of electronics but it is an advantage that it may be used with the most modern and efficient electronic circuits that have been developed.

FIG. 1 illustrates the simplest but not the most efficient form of multiple reflective optics. It does not, however, exhaust the possibility of this form of scanning and is, therefore, not the preferred modification. When all of the mirror segments are of the same length and are arranged as shown in FIG. 1 there is some obscuration. This constitutes a loss of energy though much less than that of the all germanium optics of the Merlen sensor. It nevertheless does not reach the ultimate which can be obtained by the present invention. The obscuration can be eliminated by tilting the mirrors so that the triangle apices are along a line corresponding to the one quarter angle of the scanning cone. This quarter angle will be referred to as $\alpha$ in the development of the more sophisticated and preferred modification of the present invention. While the problems involved in obscuration are eliminated by staggering the mirror segments this is only obtained at the cost of much larger or rather thicker scanning optics from front to back or an excessive number of mirrors as will be brought out below. This thicker scanning barrel is useful and where the additional size of horizon sensor is unobjectionable it is a practical modification, however, it is not as compact as either FIG. 1 or the prism scanning of the Merlen sensor. As a matter of fact FIG. 1 is to the relative scale of the Merlen sensor although the drawing is larger than that of the patent drawing.

Figure 2:
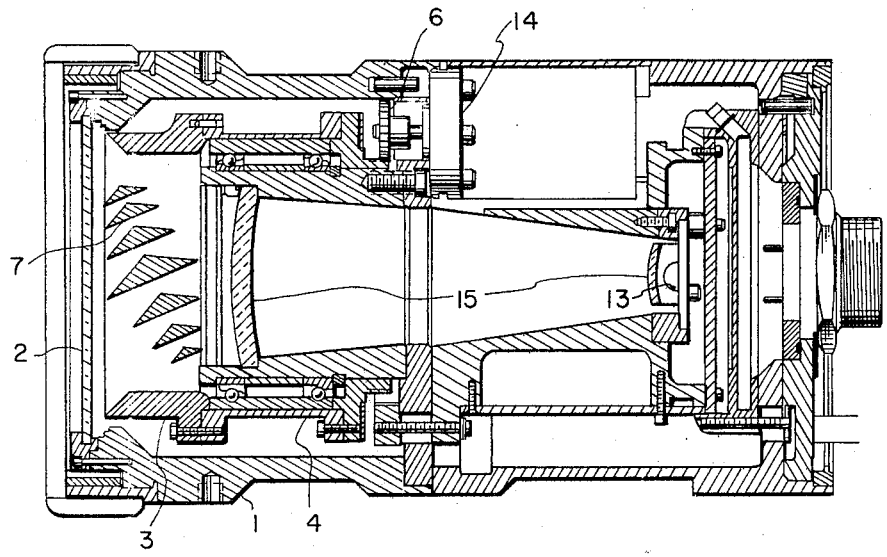
FIG. 2 is a cross section through an improved scanning head which uses catadioptric optics.

FIG. 2 illustrates the improved and preferred scanning optics according to the present invention. The mirror segments are of the same shape and bear the same reference numerals, but it will be seen that they decrease in physical size from the center toward the edge of the barrel and their edges fit in the outlines of a rhomb the acute angle of which is equal to $2\alpha$.

The framework, rotating barrel, window, etc. of FIG. 3 are the same as in FIG. 1 and, of course, the same parts bear the same reference numerals. The figure being somewhat more extensive the motor 14 is shown driving the driving gear 6. Instead of a mirror 10 with a second mirror 11 there are two silicon lenses 15 the silicon immersed bolometer 13 being mounted further in the horizon sensor. The silicon optics do not cut off sharply at $18\mu$ and thus permit a large utilization of the long wave infrared from a 200° K. body. There is also a further advantage that the design is interchangeable with the prism optics of the Merlen sensor. Many sensors have already been built and it is an advantage to be able to incorporate the scanning optics of the present invention without complete reconstruction.

The size and spacing of the mirrors in FIG. 2 are developed as follows. The altitude of the rhomb defined by the mirror edges is designated $W$. The spacing between the central mirror and the second, third and fourth mirrors, etc. will be designated $a$, $b$ and $c$, etc., the same spacings, of course, occurring on the other side of the rhomb as the arrangement of mirrors is symmetrical about the center one. The altitude of the triangles of each mirror will be disignated $r_1$, $r_2$, $r_3$ and $r_4$ respectively counting out from the central mirror.

Spacing between the mirrors and the dimensions of the mirror triangles are expressed by the following relations:

$$a = W \sin \alpha$$
$$b = a(1 + \cos 2\alpha)$$
$$c = a(1 + \cos^2 2\alpha)$$

$$r_1 = \frac{W \sin \alpha}{2 \cos^2 \alpha}$$

$$r_2 = r_1 \cos 2\alpha$$
$$r_3 = r_1 \cos^2 2\alpha$$
$$r_4 = r_1 \cos^3 2\alpha$$

It will be noted that the spacings from the center mirror increase by a power of $\cos 2\alpha$ and that the altitudes of the triangles change by a factor of increasing powers of $\cos 2\alpha$. With moderately large scan angles, which occur in practical horizon sensors, $2\alpha$ represents a moderate angle. In the case of a 75° cone angle $2\alpha$ is 37.5° The cosine is less than .8. As a result it will be seen that as the ends of the rhomb are approached the spacings become quite small. Theoretically they approach zero but in a practical scanner the last mirrors are so small and cover such a small fraction of the aperture that three or four mirrors on either side of the center mirror are sufficient. In fact in many instruments the aperture may actually be smaller than the rhomb size and hence result in no loss of aperture. This is the case in FIG. 2.

When FIG. 2 is compared with FIG. 1 it will be seen that in the same compact space the arrangement of mirrors in the form of a rhomb eliminates obscuration and at the same time reduces the weight of the mirrors. This is an important factor in horizon sensors for space vehicles. The same extreme ruggedness is preserved as the mirrors fit into grooves in the barrel 3 as is shown in FIG. 3.

Reference has been made above to the use of staggered mirrors of the same size. These mirrors can be thought of as fitting into the rectangle inclined by an angle $\alpha$ as in the case of the rhomb. Since the sides are parallel no arrangement will fit into as small a space as will the same number of mirrors in a rhomb or mirrors arranged as described in FIG. 1. The increase in space would, of course, be small if the rectangle were very slender with mirrors of extremely small size. In such a case an impractical instrument results. This can be realized if we consider that the mirror spacings in a rectangle would be equal. The great advantage of the rhomb is that the spacing of mirrors increases from the ends of the rhomb toward the center and with a smaller number of mirrors substantially the whole aperture is covered. For this reason arrangement of mirrors in a tilted rectangle is far less desirable than the preferred modification which is shown in FIG. 2. The instrument is still a workable instrument and shares with the preferred modification the enhanced energy gathering power. Therefore, such arrangements are not excluded from a broad aspect of the present invention but they present no advantage over the preferred modification and ordinarily this will be used.

Figure 4:
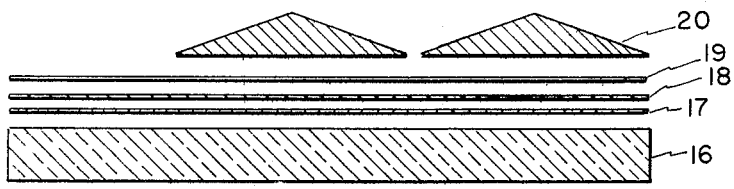
FIG. 4 illustrates a method of making the mirrors which, in a more restricted aspect, is also a feature of the present invention.

It is a very difficult matter to polish mirror surfaces where there are extremely sharp edges as is the case with mirrors in the present invention. This has been overcome by a technique illustrated in FIG. 4 which shows an exploded view. The subject matter of the technique illustrated in FIG. 4 is not claimed as such in the present application, but form the subject matter of my divisional application Serial No. 336,568, filed January 8, 1964. A highly polished optical surface, such as a glass plate which is shown at 16, is coated with a thin layer 17 of copper by vacuum deposition. On this is then deposited the final mirror layer. This may be a layer of aluminum 18 or of a material which exhibits the characteristics of a reststrahlen filter. Then a thin layer of a cement 19 such as an epoxy resin is applied and the triangular shape of the mirrors, which may be in the form of aluminum blocks 20, are pressed down into the epoxy resin and then the latter is cured to form a hard cement.

The blocks are easily removed from the glass as the copper layer has poor adhesion and the copper layer is then dissolved off. In the case of aluminum as the mirror layer this may be effected with 70% nitric acid. In the case of other surfaces a material must be used which will not attack the surface. There is then left a replica of the original mirrored glass surface and this surface is perfect even to the sharp edges of the mirror blocks which would be impractical in the case of polishing with shapes having such sharp edges. Adhesion of the epoxy resin to the upper sides of the block is avoided by coating them lightly with an oil to which the epoxy resin does not adhere.

In the case of mirrors which are to be nonselective and may, therefore, have an aluminum surface the block itself can be anything, for example, aluminum with a matte surface. If a reststrahlen layer is to be put down there must be an absorbing backing which can be effected with aluminum blocks by suitable black anodizing.

When no reststrahlen filters are used the silicon optics would pass shorter wavelength infrared. If it is desired to cut off at 13µ mirror surfaces can either be reststrahlen mirrors as described in the Weiss application referred to above or a suitable additional filter may be used which may, for example, be in the form of the window 2.

The mirrors illustrated above are all plane mirrors. For many purposes this is the most desirable form. However, it is possible to use curved mirrors which will focus the scanned rays thus making it possible to eliminate some of the imaging optics. Considerable difficulties in the form of aberrations result and for most purposes the plane mirrors are preferable. The curved mirrors can, of course, be made by the technique described in connection with FIG. 4 the substrate 16 being, of course, curved to the proper radius.

I claim:
1. In a conical scanning horizon sensor comprising a radiation detector and a rotating scanning element, the axis of rotation of the element passing through the detector, the improvement which comprises,

(a) a series of mirrors mounted in the rotating scanning element the mirrors being arranged in a form resembling a venetian blind and inclined at one quarter the cone scan angle,
(b) the mirrors being spaced in a direction at right angles to the axis to minimize aperture obscuration, and
(c) baffling means spaced between the mirrors in said direction and rotating therewith for minimizing the entrance of direct rays onto the sensor between the mirrors.

2. A horizon sensor according to claim 1 in which,
(a) the mirrors are staggered along a rhomb defined by the extremities of the mirrors,
(b) the rhomb has an angle of inclination $\alpha$ equal to half its acute angles and corresponding to one quarter scan cone angle, and
(c) the spacing between mirrors counting out from the center being $W \sin \alpha$ for the first pair and increasing by powers of $\cos 2\alpha$ the spacing from the center mirror successively further mirrors where $W$ equals the altitude of the rhomb.

3. A horizon sensor according to claim 2 in which the mirrors are of isosceles triangular shape, the legs constituting direct light baffles and the altitude of the isosceles triangle for the central mirror being $$\frac{W \sin \alpha}{2 \cos^2 \alpha}$$

the altitudes of each successive mirror toward the apices of the rhomb diminishing by a factor constituting an integrally increasing power of $\cos 2\alpha$.

4. A horizon sensor according to claim 1 in which there is provided in the optical path in the scanner a reststrahlen filter reflecting long wave infrared.

5. A horizon sensor according to claim 4 in which the reststrahlen filter is of lithium fluoride and, therefore, reflects infrared radiation of wavelength longer than approximately 13µ.

6. A horizon sensor according to claim 2 in which there is provided in the optical path in the scanner a restsrahlen filter reflecting long wave infrared.

7. A horizon sensor according to claim 6 in which the reststrahlen filter is applied to the reflecting surfaces of each of the mirrors.

8. A horizon sensor according to claim 7 in which the reststrahlen filter is of lithium fluoride and, therefore, reflects infrared radiation of wavelength longer than approximately 13µ.

9. A horizon sensor according to claim 1 in which the mirrors are plane mirrors.

10. A horizon sensor according to claim 2 in which the mirrors are plane mirrors.

References Cited by the Examiner

UNITED STATES PATENTS

| 1,918,545 | 7/1933 | Hoy | 156—18 |
| 2,960,001 | 11/1960 | Dauguet | 250—83.3 X |
| 3,020,407 | 2/1962 | Merlen | 250—83.3 |
| 3,038,077 | 6/1962 | Gillespie et al. | 250—83.3 |
| 3,053,720 | 9/1962 | Edds | 156—18 |

OTHER REFERENCES

Concepts of Classical Optics, by John Strong, published by W. H. Freeman & Co., copyright 1958, pages 589–596.

RALPH G. NILSON, *Primary Examiner.*

A. R. BORCHELT, *Assistant Examiner.*